(12) United States Patent
Furukawa et al.

(10) Patent No.: US 6,172,946 B1
(45) Date of Patent: Jan. 9, 2001

(54) OPTICAL RECORDING DEVICE FOR ADJUSTING THE ROTATION RATE OF RECORDING MEDIUM DURING SEEKING OPERATION

(75) Inventors: Shigeaki Furukawa; Kenichi Nishiuchi, both of Osaka (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 08/879,550

(22) Filed: Jun. 20, 1997

(30) Foreign Application Priority Data

Jun. 24, 1996 (JP) .................................................. 8-163288

(51) Int. Cl.⁷ .................................................. G11B 17/22
(52) U.S. Cl. ............................... 369/32; 369/215; 369/50
(58) Field of Search ............................. 369/32, 215, 216, 369/217, 219, 224, 227, 50, 33, 44.28, 44.29

(56) References Cited

U.S. PATENT DOCUMENTS

| | | | | |
|---|---|---|---|---|
| 4,672,595 | * | 6/1987 | Senso | 369/50 |
| 4,680,746 | * | 7/1987 | Senso | 369/50 |
| 5,671,200 | * | 9/1997 | Yamaguchi et al. | 369/44.28 |
| 5,883,866 | * | 3/1999 | Shimizume et al. | 369/50 |

* cited by examiner

Primary Examiner—Tan Dinh
(74) Attorney, Agent, or Firm—Merchant & Gould P.C.

(57) ABSTRACT

This invention provides an optical recording-reading device that prevents deterioration of the recorded signals on the optical recording medium caused by the optical beam, and the optical recording-reading device can store information safely. An optical recording-reading device comprises an optical head to produce an optical beam, a transfer board to move the optical beam, and a motor that rotates a disk optical recording medium having a recording thin film which changes its state due to the irradiation of the optical beam. Recording and reading are conducted at a relative velocity between the optical beam and the optical recording medium that is determined as a substantially constant linear velocity. The optical recording-reading device has a transfer control unit to control the movement of the optical beam, and rotation rate control unit to control the rotation rate of the optical recording medium. When the optical beam moves to seek on the optical recording medium, the relative velocity between the optical beam and the optical recording medium is maintained at a predetermined linear velocity or above by using the transfer control unit and the rotation rate control unit.

1 Claim, 5 Drawing Sheets

OPTICAL RECORDING DEVICE FOR ADJUSTING THE ROTATION RATE OF RECORDING MEDIUM DURING SEEKING OPERATION

FIELD OF THE INVENTION

This invention relates to an optical recording-reading device, more specifically, this invention relates to an optical recording-reading device that prevents deterioration of recorded signals on the optical recording medium due to the seeking optical beams while the optical beam is moved to conduct a seek operation on the optical recording medium.

BACKGROUND OF THE INVENTION

Recently optical recording media that enable recording, reading and erasing of information have been commercialized and high density rewritable optical recording media that can record qualified animation have been actively developed.

Well-known rewritable optical recording media include phase-change optical recording media which have recording layers either of chalcogenide thin films or semimetal thin films. Chalcogenide thin films comprise Te or Se such as Ge—Sb—Te and In—Se. The semimetal thin films comprise In—Se etc. There are provided well-known magneto-optical recording media having metal thin films such as Fe—Tb—Co for their recording layers. Write once type optical recording media using pigment materials are also known.

In an optical recording-reading device having a phase-change recording medium, recording thin films containing the above-mentioned phase-change materials are instantly irradiated with laser beams focused on submicron-order size optical spots in order to heat the limited portion to a predetermined temperature. When the temperature of the irradiated portion is higher than the crystalline temperature, the crystalline state of the small portions only can be changed, and the state can be changed to the amorphous state if the temperature exceeds its melting point. Once either of the crystalline state or the amorphous state is determined to be the recording state or the erasing state (unrecorded state), recording and erasing of information can be conducted reversibly. Since the crystalline state and amorphous state are distinguishable from each other in their optical characteristics, signals can be read by optically detecting such different characteristics.

In an optical recording-reading device using a magneto-optical recording medium, for example, focused laser beams are irradiated on a magneto-optical recording thin film comprising the above metal thin films, so that the irradiated portions are sectionally heated to a predetermined temperature. A magnetic field is applied to the heated portion in order to control the magnetizing direction of the magneto-optical recording thin film, and thus, information will be recorded or erased.

Uneven tracks are formed concentrically or spirally on the substrate of the optical recording media beforehand, and recording-reading is carried out by using the following device. In this device, optical beams generated from a light source such as a semiconductor laser are focused through a focusing lens to have a small beam diameter and the beam is irradiated on a rotating disk optical recording medium. Recording is conducted by changing the beam's light quantity corresponding to the signals to be recorded. The signals are read by adjusting the quantity of the optical beam to be weak and constant, and by detecting the light reflected from the optical recording medium. Since the uneven track pitches are of a small size on the order of 1 $\mu$m, this device is provided with a focusing control, and seek control so that the light spot is irradiated accurately on this track. The focusing control controls the optical beam to maintain an unchanged micro spot diameter. The seek control carries out tracking control so that the optical beam always scans on a track with accuracy, and transfer control to move the optical beam to the desired position of the optical recording medium.

Recording-reading methods for an optical recording medium include a constant linear velocity (CLV) technique and a constant angular velocity (CAV) technique. CLV (including zone CLV) indicates that recording and reading are conducted at a constant linear velocity. CAV (including zone CAV) indicates that recording and reading are conducted at a constant angular velocity. When recording-reading is conducted with a single beam, especially, recording-reading is preferably done with a constant data transfer rate for recording and reading music or image information. CLV is suitable for this purpose. In CLV, recording and reading are conducted at constant linear velocity, so the rotation rate of the optical recording medium is controlled to be high when the optical beam is scanning the inside portions, and the rotation rate is controlled to be low when the optical be am is scanning the periphery. In the zone CLV, the optical recording medium is divided into plural zones in the radial direction. The average linear velocity is controlled to be stable by keeping the rotation rate constant and by changing rotation rates among the zones.

When signals recorded in an optical recording medium are read by using such a device and technique, the power of the optical beam (hereinafter, reading power) should be adjusted to a level where the record signals will not deteriorate due to the optical beam (this phenomenon is hereinafter called read light deterioration). On the other hand, the reading power is required to be as large as possible to increase the output of the signals recorded in the optical recording medium. Therefore, an appropriate reading power value is selected and set considering some elements such as the linear velocity of the recording medium, read light deterioration, and the degree of the signal output.

However, in a conventional optical recording-reading device using CLV technique, the irradiated optical beam may have a larger energy than expected when moving the optical beam on the aimed tracks on the optical recording medium by using the predetermined reading power.

When the optical beam moves from the periphery to the inside of the optical recording medium, the rotation control unit is controlled so that the optical recording medium will have a higher rotation rate in order to maintain a predetermined linear velocity. However, if the stand-up (the rotation reaching the predetermined rate) is delayed, the relative linear velocity between the optical beam and the optical recording medium is lowered. As a result, the energy of the irradiation per time on a predetermined area of the optical recording medium is substantially raised, and the record signals may deteriorate.

An optical beam typically will count the slot-crossing number of the tracking signals and move to a predetermined track, so the optical beam will move while focus-controlling of the optical beam takes place. As a result, the power of the optical beam which is moved and irradiated on the recording track may be stronger than the appropriate reading power while the optical beam moves from the periphery to the inside of the optical recording medium. Such a problem will occur when the rotation rate of the optical recording medium is not raised due to malfunction or failure of the rotation control unit, or when the optical beam scans on the track before it reaches the predetermined linear velocity. As a result, the record signals on the optical recording medium may deteriorate.

In order to prevent this kind of deterioration of record signals, the strength of the motor drive to rotate the optical recording medium can be raised to increase the rotation rate of the optical recording medium to a predetermined value in a short time. However, the rotation rate of recent optical recording media will reach 4800 rpm because of the high transfer rate trend. Therefore, electric power consumption should be increased to obtain a desirable rotation in a short time. Furthermore, strengthening the motor drive is not considered easy for portable information appliances in view of energy-saving considerations.

SUMMARY OF THE INVENTION

This invention aims to resolve these and other problems by providing optical recording-reading devices that can prevent deterioration of record signals caused by read light and can store information safely.

In order to achieve such purposes, an optical recording-reading device of this invention comprises an optical head to produce an optical beam, a transfer system to move the optical beam, and a motor to rotate a disk optical recording medium that has a recording thin film changing its state due to the optical beam irradiation. The optical recording-reading device records and reads while the relative velocity between the optical beam and the optical recording medium is kept at a substantially constant linear velocity. The device also comprises a transfer control unit to adjust the position of the optical beam, and a rotation rate control unit to adjust the rotation rate of the optical recording medium. When the optical beam moves to seek on the optical recording medium, the relative velocity between the optical beam and the optical recording medium is maintained at or above a predetermined linear velocity by using the transfer control unit and the rotation rate control unit.

Due to this construction, excess irradiation by the optical beam on the optical recording medium is prevented, and thus, signal deterioration on the optical recording medium is prevented and information on the optical recording medium can be stored safely.

It is preferable that the transfer control unit begins to move the optical beam after the rotation rate control unit begins to control the rotation rate of the optical recording medium if the optical beam moves to the inside of the optical recording medium at seek. On the other hand, the rotation rate control unit preferably begins to control the rotation rate of the optical recording medium after the transfer control unit begins to move the optical beam if the optical beam moves to the periphery of the optical recording medium.

It is more preferable that the rotation rate control of the optical recording medium and the transfer-control of the optical beam simultaneously begin at seek, and the rotation rate control is more accelerated than the transfer of the optical beam if the optical beam moves toward the inside of the optical recording medium, while the transfer of the optical beam is more accelerated than the rotation rate control of the optical recording medium if the optical beam moves to the periphery of the optical recording medium.

It is further preferable that the rotation rate of the optical recording medium and the transfer of the optical beam are simultaneously controlled when the moving length of the optical beam is less than a predetermined value at seek; the transfer control unit begins to move the optical beam after the rotation rate control unit begins to control the rotation rate of the optical recording medium when the moving length of said optical beam is at least the predetermined value and the optical beam moves toward the inside of the optical recording medium; and the rotation rate control unit begins to control the rotation rate of the optical recording medium after the transfer control unit begins to move the optical beam when the moving length of the optical beam is at least the predetermined value and the optical beam moves to the periphery of the optical recording medium.

This invention provides an optical recording-reading device comprising an optical head to produce an optical beam, a transfer system to move the optical beam, and a motor to rotate a disk optical recording medium having a recording thin film that changes its state due to the irradiation of the optical beam; and conducting recording and reading according to the relative velocity between the optical beam and the optical recording medium as a substantially-constant linear velocity. The optical recording-reading device is provided with a transfer control unit to control the movement of said optical beam, a rotation rate control unit to control the rotation rate of the optical recording medium, a position detecting unit to detect the position of the optical beam, and a rotation rate detecting unit to detect the rotation rate of the optical recording medium. The position detecting unit detects the current position of the optical beam when the optical beam moves to seek on the optical recording medium, deciding the moving direction of the optical beam by comparing the current position and the moving position of the optical beam, maintaining the relative velocity between the optical beam and the optical recording medium to be at least at a predetermined linear velocity by using the transfer control unit, the rotation rate control unit, the position detecting unit and the rotation rate detecting unit corresponding to the moving direction.

Accordingly, excess irradiation from the optical beam on the optical recording medium caused by malfunction can be prevented even if either the transfer system or the motor is damaged for some reason, since either the position of the optical beam or the rotation rate of the optical recording medium is checked before continuing the control. As a result, signal deterioration on the optical recording medium can be prevented and information on the optical recording medium can be stored safely.

It is preferable that the rotation rate of the optical recording medium is increased by using the rotation rate control unit if the optical beam moves toward the inside of the optical recording medium, and the transfer control unit is used to move the optical beam to a predetermined position after checking by using the rotation rate detecting unit that the optical recording medium obtains predetermined rotation rate. On the other hand, the position of the optical beam is preferably transferred by using the transfer control unit if the optical beam moves toward the periphery of the optical recording medium, and the rotation rate control unit is used so that the optical recording medium has a predetermined rotation rate after the position detecting unit is used for checking that the optical beam is at the predetermined position.

It is also preferable that the output of the optical beam is lower when the optical beam moves on the optical recording medium for seek compared to the output of the optical beam when reading information that is recorded on the optical recording medium. Alternatively, the focal position of the optical beam is preferably shifted by a predetermined degree when the optical beam moves on the optical recording medium for seek from the position where the information recorded on the optical recording medium is being read.

DETAILED DESCRIPTION OF THE INVENTION

Figure 1:
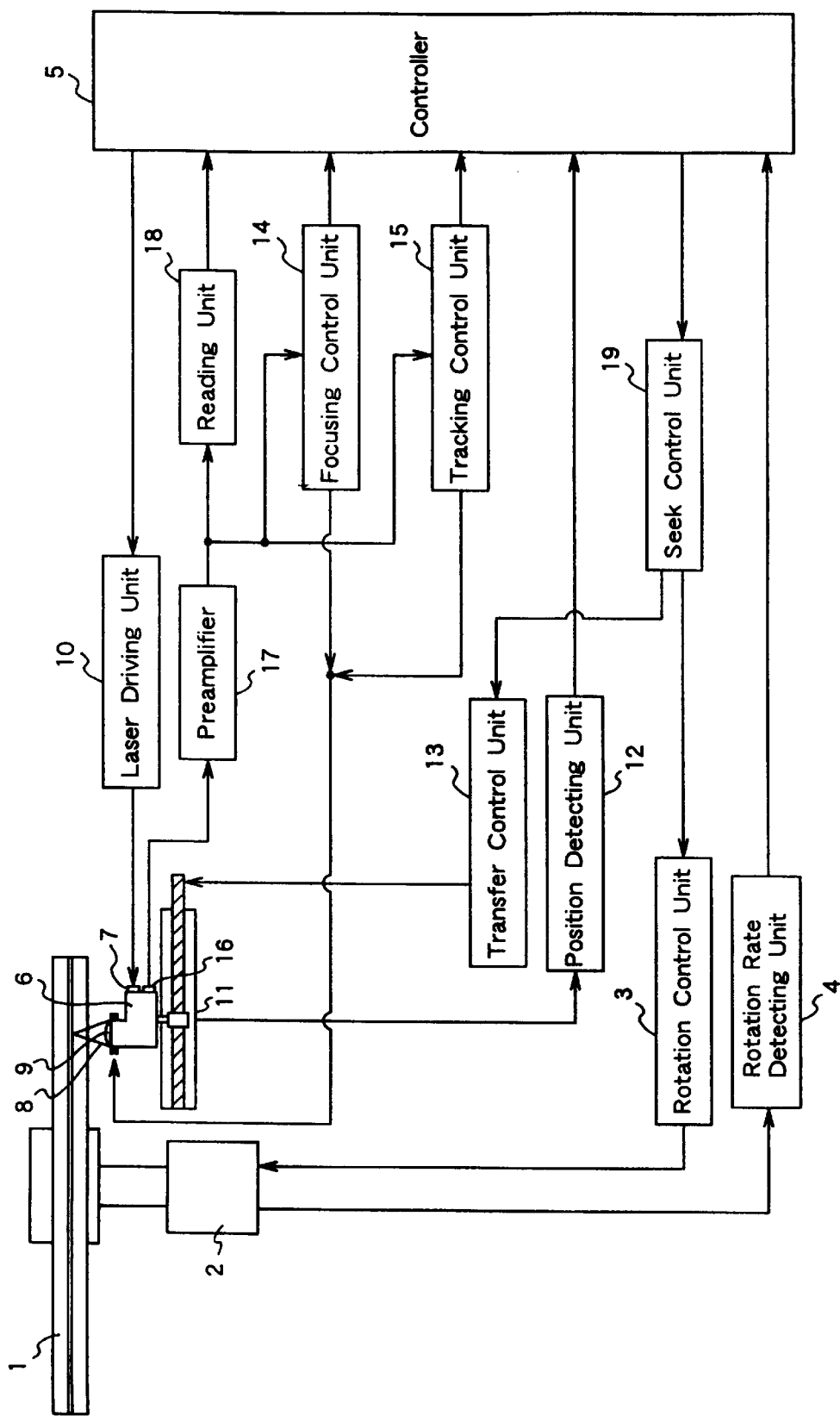
FIG. 1 is a schematic view showing the structure of an optical recording-reading device in a first embodiment of the present invention.

The optical recording-reading device in the embodiments of this invention is described below referring to the drawings.

FIG. 1 shows the structure of an optical recording-reading device in a first embodiment of this invention. In FIG. 1, an optical recording medium 1 is attached to a motor 2 in order to rotate at a predetermined rotation rate. The rotation rate of the optical recording medium 1 is controlled by a rotation control unit 3, and the value signal of the rotation rate detected by a rotation rate detecting unit 4 is sent to a controller 5. A transfer board 11 as a transfer system comprises an optical head 6, and the optical head 6 has a laser 7, an object lens 9 and an photodetecting unit 16. An optical beam 8 from the laser 7 (light source) is focused by the object lens 9 and irradiates the optical recording medium 1. A laser drive unit 10 controls the laser 7 so that the power of the optical beam 8 corresponds to the level of recording, erasing and reading. The transfer board 11 moves the optical head 6 to move the optical beam 8 to the desired position on the optical recording medium 1. The position of the optical beam 8 is detected by a position detecting unit 12, and the detected value signals are sent to the controller 5. When an instruction for transferring the optical beam 8 is sent from the controller 5 to a seek control unit 19, the seek control unit 19 will send signals to a transfer control unit 13 and to the rotation control unit 3, and thus, transfer of the transfer board 11 and the rotation rate of the motor 2 are controlled. A focusing control unit 14 focuses the optical beam 8 on the optical recording medium 1. A tracking control unit 15 tracks the optical beam 8 to the desired track. The reflection light of the tracked optical beam 8 is converted to electrical signals in the photodetecting unit 16. The electrical signals are amplified in a preamplifier 17 and then, respectively sent to a reading unit 18 to demodulate the information, to the focusing control unit 14 for feedback of the focusing detection, and to the tracking control unit 15 for feedback of the tracking detection.

For the optical recording medium 1 of this embodiment, a rewritable type medium or a write once type medium can be used. A rewritable type optical recording medium comprises phase change recording materials or magneto-optical recording materials. The phase change recording materials comprise, for example, Ge—Sb—Te, and can reversibly change their states between a crystalline state and an amorphous state. The magneto-optical recording materials comprise Fe—Te—Co and can reversibly change their magnetizing direction. The write once type optical recording medium, such as CD-R, comprises TeOx inorganic materials and organic pigment materials. These optical recording media 1 typically have uneven tracks and the optical beam 8 will be irradiated along the tracks. Furthermore, address numbers are engraved on the tracks in order to pinpoint the position on the optical recording media 1. The transfer board 11 can use a linear motor for controlling the transfer of the optical head 6 with high speed, or it can use a ball-screw transfer mechanism in view of impact resistance.

Operations for the optical recording-reading device in this embodiment are described below.

A technique called CLV, including the zone CLV technique, is used to record or read information by irradiating the optical beam 8 from the optical head 6 onto the optical recording medium 1 of the optical recording-reading device of this embodiment. In this CLV technique, the relative linear velocity between the optical beam 8 and the optical recording medium 1 is constant. In the zone CLV technique, the optical recording medium 1 is divided into plural zones whose average linear velocities are the same. The CLV technique is used to record and read in the following manner.

First, signals for position control (seek instruction signals from the controller 5) are sent to the transfer board 11, and signals for rotation control is sent to the motor 2. When the transfer board 11 receives the signals, it moves the optical head 6, and the optical beam 8 is tracked on the predetermined position of the track in order to read the address signals, and thus, the final position information is sent to the controller 5. The motor 2 controls the rotation rate so that the relative linear velocity maintains at least the predetermined value. In other words, the rotation rates of the motor 2 is increased when the optical beam 8 seeks from the periphery to the inside, while it is decreased when the optical beam 8 seeks from the inside to the periphery, so that appropriate read light power is irradiated to the optical recording medium 1 when the optical beam 8 is seeking.

It is preferable that the read light power of the optical beam 8 is increased as much as possible to raise S/N of the read signals as long as the information does not deteriorate due to the read light, and that the output signals of the photodetecting unit 16 are increased. Therefore, the read light power was determined from the experiments under the following conditions. A phase change recording medium was used for the optical recording medium 1. The wavelength of the optical beam 8 was 680 nm, the aperture number (NA) of the object lens 9 was 0.6, and the read linear velocity was 6 m/s. Single signals having 5 MHz frequency were recorded and continuously read 10 million times in order to obtain the relationship between the degree of decrease of the signals amplitude and the read light power. The signal amplitude was not decreased when the read light power was 1.0 mW. When the read light power was 1.1 mW, the amplitude decrease was about 6 dB after 10 million times. In another experiment where the read light power was 1.2 mW, the amplitude began to decrease soon after tracking on the record signals. The amplitude was remarkably decreased, and the record signals were not be able to be read. Considering the above result, the read light power was set to be 1.0 mW, though it is just one example and this numeral does not limit this invention, since the appropriate read light power changes due to the sensitivity of the optical recording medium 1 or due to the read linear velocity.

The flow charts show the process for seek and control under the predetermined read light power.

Figure 2:
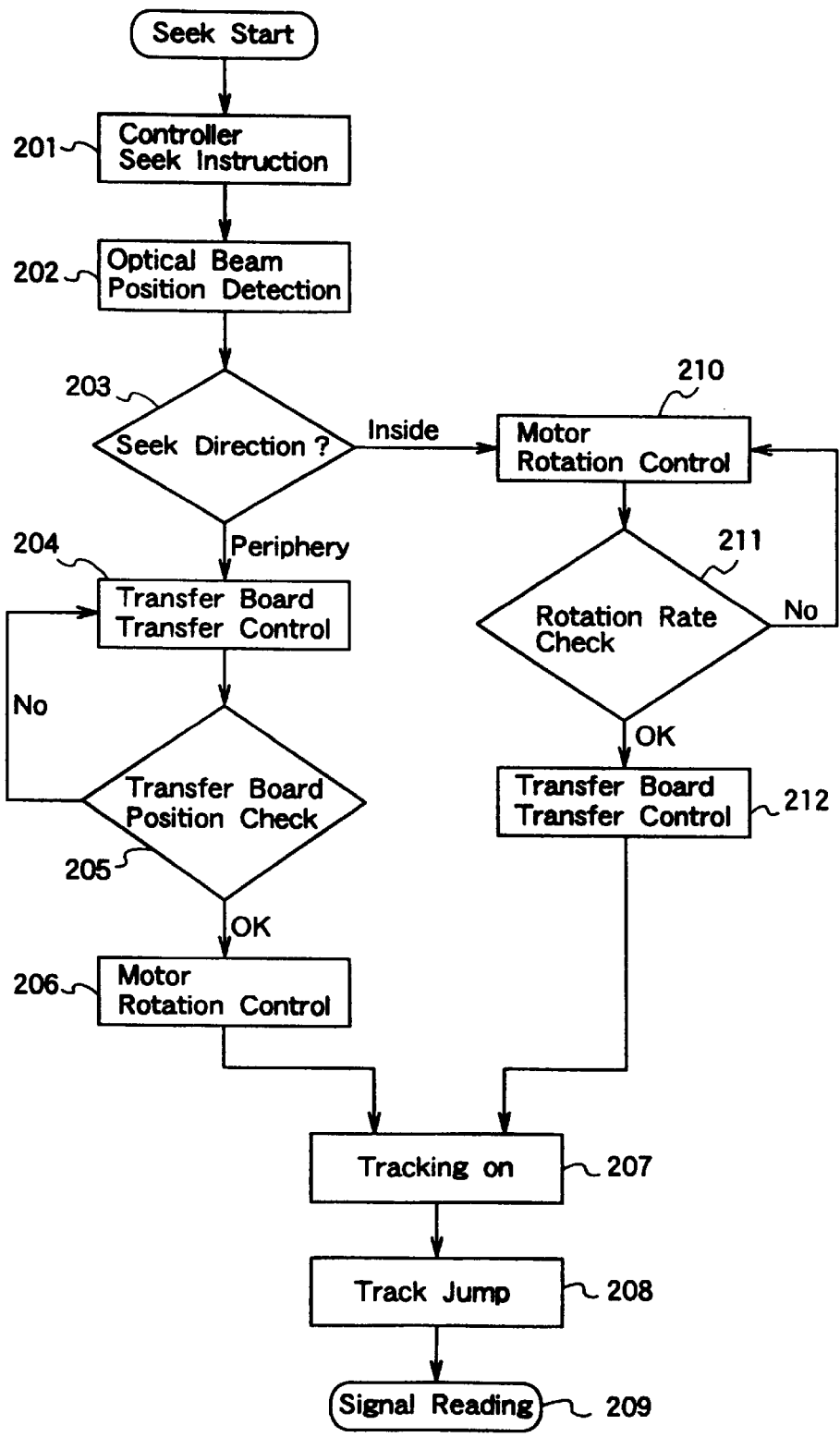
FIG. 2 is a flow chart to explain the control by the optical recording-reading device in the first embodiment.

FIG. 2 is a flow chart showing the seek operation. If the controller 5 instructs seek in step 201, the present location of the optical beam is detected in step 202. The position detection is specified by using a position sensor of the ball-screw transfer mechanism or the linear motor, or the address number of the optical recording medium 1. In step 203, a decision is made whether the seek is directed to the periphery or to the inside, taking into account the signals detected in step 202.

If the direction is decided to be outward in step 203, the transfer board 11 is driven by the signals from the transfer control unit 13, and the optical head 6 is moved in step 204. In step 205, the position of the transfer board 11 is detected by using the position detecting unit 12 to decide whether the transfer board 11 has moved to the predetermined position. If the transfer board 11 is not moved to the predetermined position, step 204 will be repeated. If the board 11 has been at the predetermined position, step 206 can be carried out. In step 206, the rotation motor 2 is driven and the optical recording medium 1 is controlled to have a predetermined rotation rate. In the next step 207, the optical beam 8 is tracked on and, track-jumped to the desired signals in step 208, and the signals are begun to be read in step 209.

In the steps from 204 to 209, the optical beam 8 moves to the periphery before the optical recording medium 1 has the predetermined rotation rate. At the periphery, the relative velocity will increase. As a result, irradiation energy per unit area and per unit time is reduced, and deterioration of the record signals due to the read light can be prevented.

If the light is decided to be moving to the inside, in step 203, the rotation rate of the motor 2 is controlled to increase in step 210. In step 211, the rotation rate of the motor 2 is detected by using the rotation rate detecting unit 4 in order to decide whether it reaches the predetermined number. If not so, rotation control is repeated in step 210, and step 212 can be conducted after the rotation is checked in step 211 as to whether the predetermined rate is obtained. In step 212, the transfer board 11 moves to the predetermined position after the rotation reaches the predetermined rate. Next, the optical beam 8 is tracked on in step 207, track-jumped to the aimed signal in step 208, and the signal-reading starts in step 209.

In the steps from 210 to 212, the transfer board 11 is moved after the rotation rate of the optical recording medium 1 reaches the rotation rate of the position the optical beam will finally reach. Therefore, the relative velocity of the optical beam is maintained at least at the predetermined value while the irradiation energy per unit area and per unit time is maintained to be that of information reading at most. As a result, deterioration of the record signals due to the read light can be prevented.

In this embodiment, step 212 is carried out after step 210, which does not limit this invention. It is also possible that the transfer board 11 begins to move (step 212) at the same time that the rotation rate begins to increase (step 210). In this case, the rotation control unit 3 controls the rotation rate of the motor 2 while the position detecting unit 12 is detecting the position of the optical beam 8 so that the linear velocity of the optical beam 8 maintains at least the linear velocity for reading. In other word, the optical beam 8 is in synchronism with the motor 2. As a result, time for seek-control can be shortened since the rotation rate control for the motor 2 and the movement of the transfer board can start simultaneously.

Concerning the time reduction for the seek, rotation control can start a little later than transfer control when the optical beam 8 moves from the inside to the periphery. On the other hand, transfer control should start a little later than rotation control when the optical beam 8 moves from the periphery to the inside. In the seek, the transfer control acceleration is greater than that of the rotation control when moving from the inside to the periphery, and the acceleration of the rotation control is greater than that of the transfer control when moving from the periphery to the inside.

In such an optical recording-reading device in this embodiment, the optical beam 8 constantly tracks at least at the predetermined read linear velocity. Therefore, the optical beam 8 will not scan on the track 8 before the predetermined linear velocity is obtained, and the energy irradiated on the optical recording medium 1 is proper per unit area and also per unit time. As a result, deterioration of the record signals due to the read light can be prevented, and the record signals are protected, namely, the information is stored safely.

Figure 3:
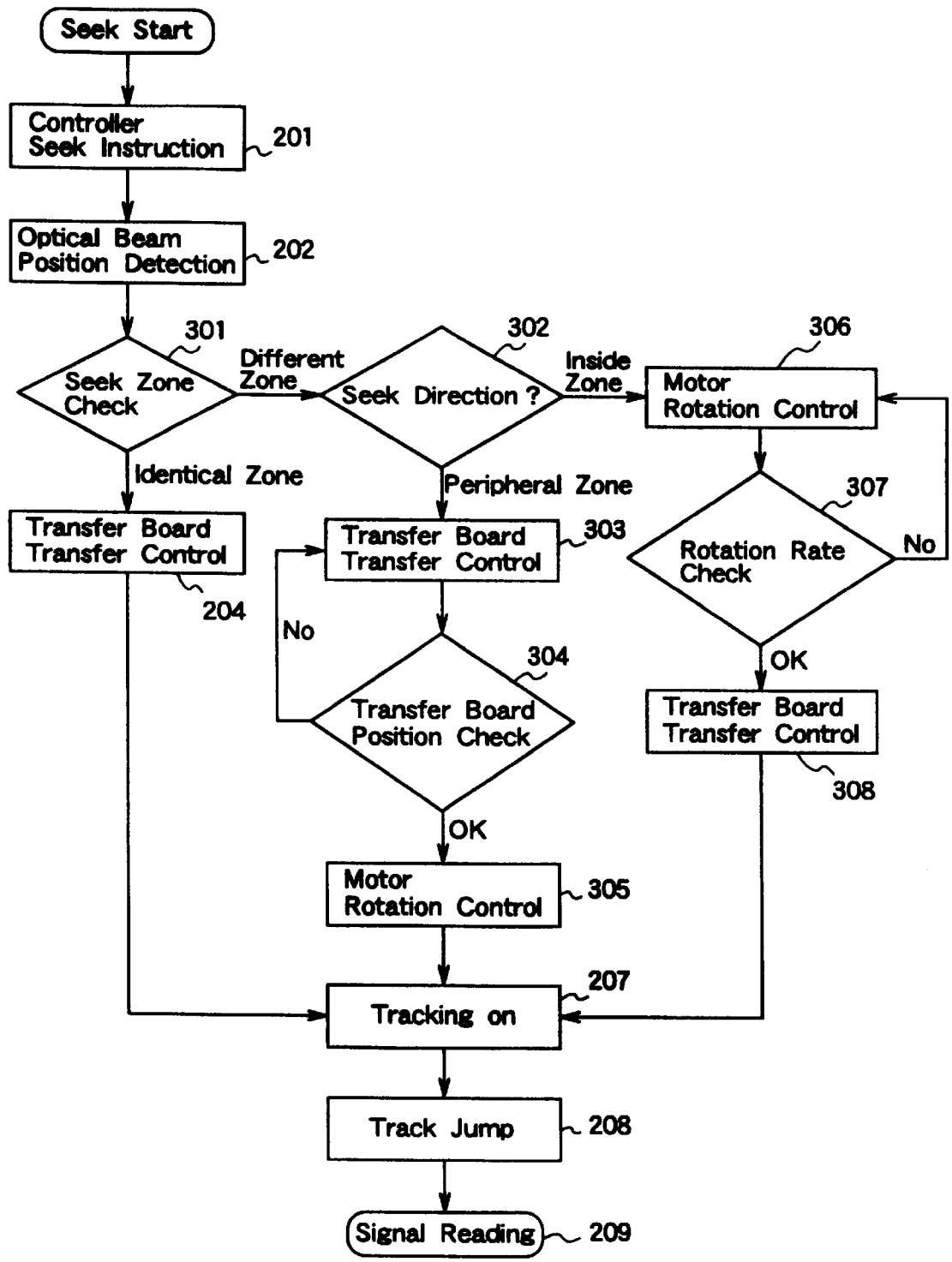
FIG. 3 is another flow chart to explain the control by the optical recording-reading device in the first embodiment.

In a zone CLV technique, the optical recording medium 1 is divided into plural zones. In this case, the seek zone is checked in step 301 as shown in FIG. 3 (flow chart). The signals can be read by conducting steps 207–209 after the transfer board 11 is moved in step 204 for seeking in an identical zone. For seeking different zones, a decision should be made whether the seek is conducted toward the inside or toward the periphery (step 302). In case of a transfer to the periphery zone, signals are read by conducting steps 207–209 after steps 303–305. In the other case, signals can be read by conducting steps 207–209 after steps 306–308.

In the following an optical recording-reading device in the second embodiment of this invention is explained, referring to FIG. 4.

Figure 4:
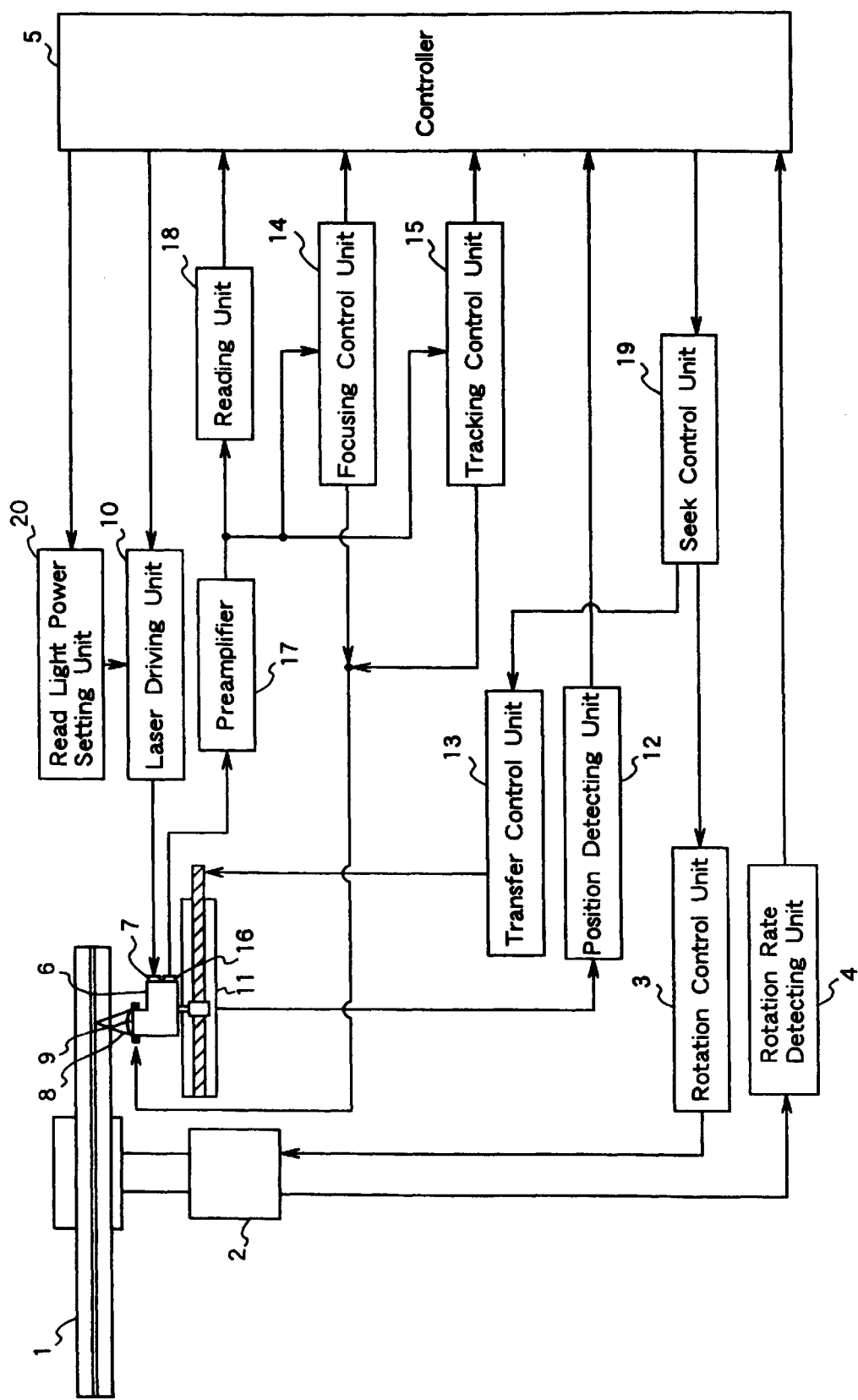
FIG. 4 is a schematic view showing the structure of an optical recording-reading device in a second embodiment of the present invention.

In FIG. 4, elements from the optical recording medium 1 to the detection control unit 19 can be the same as those of the first embodiment, except that read light power setting unit 20 is provided.

The operation of the optical recording-reading device in this embodiment is explained below.

Like the first embodiment, the CLV technique including the zone CLV technique is used for recording or reading information by irradiating optical beam 8 from the optical head 6 on the optical recording medium 1 by using the optical recording-reading device of this embodiment. The following control will be conducted for recording and reading in this CLV technique.

First, a seek instruction from the controller 5 is sent to the seek control unit 19; the transfer control unit 13 controls the transfer board 11 according to the instruction; and the rotation control unit 3 controls the motor 2. In this manner, the optical beam 8 tracks on the predetermined position, so that the relative linear velocity of the optical beam 8 has a predetermined value. The read light power of the optical beam 8 is controlled by the read light power setting unit 20 so that the power of the optical beam 8 is lower at seeking than during reading the record signals, and it recovers its read light power when it is on the track.

The read light power of the optical beam 8 for reading the signals recorded in the optical recording medium 1 was decided in the same manner as the first embodiment. The output of the seeking optical beam 8 was decided as follows. If the reading is conducted in the outermost periphery of the optical recording medium 1 and the beam 8 moves toward the innermost side whose radius is half of the periphery while keeping its rotation rate, the linear velocity is reduced by half. For instance, if reading is conducted in the outermost periphery at 6 m/s and moves to the portion having half the radius, the optical beam 8 scans the track at a linear velocity of 3 m/s. Therefore, the power of the seeking optical beam 8 was decided in the same manner as the read light power was decided. The decision was based on the relationship between the power of the optical beam 8 and the deterioration caused by the read light when the linear velocity was 3 m/s. When the read light power was 0.8 mW, the signal amplitude decreased by about 6 dB after 10 million times reading. When the power was 0.6 mW or less, the amplitude was not lowered. Considering the result, the seeking optical beam's power was determined to be 0.5 mW to avoid the amplitude decrease.

The seeking power was decided in the above manner so that the deterioration of the record signals caused by the read light can be prevented even if the linear velocity is low at seek, since the energy irradiated on the optical recording medium 1 per unit area and per unit time is reduced. As a result, the recording information can be stored safely.

In the following an optical recording-reading device in the third embodiment of this invention is explained, referring to FIG. 5.

Figure 5:
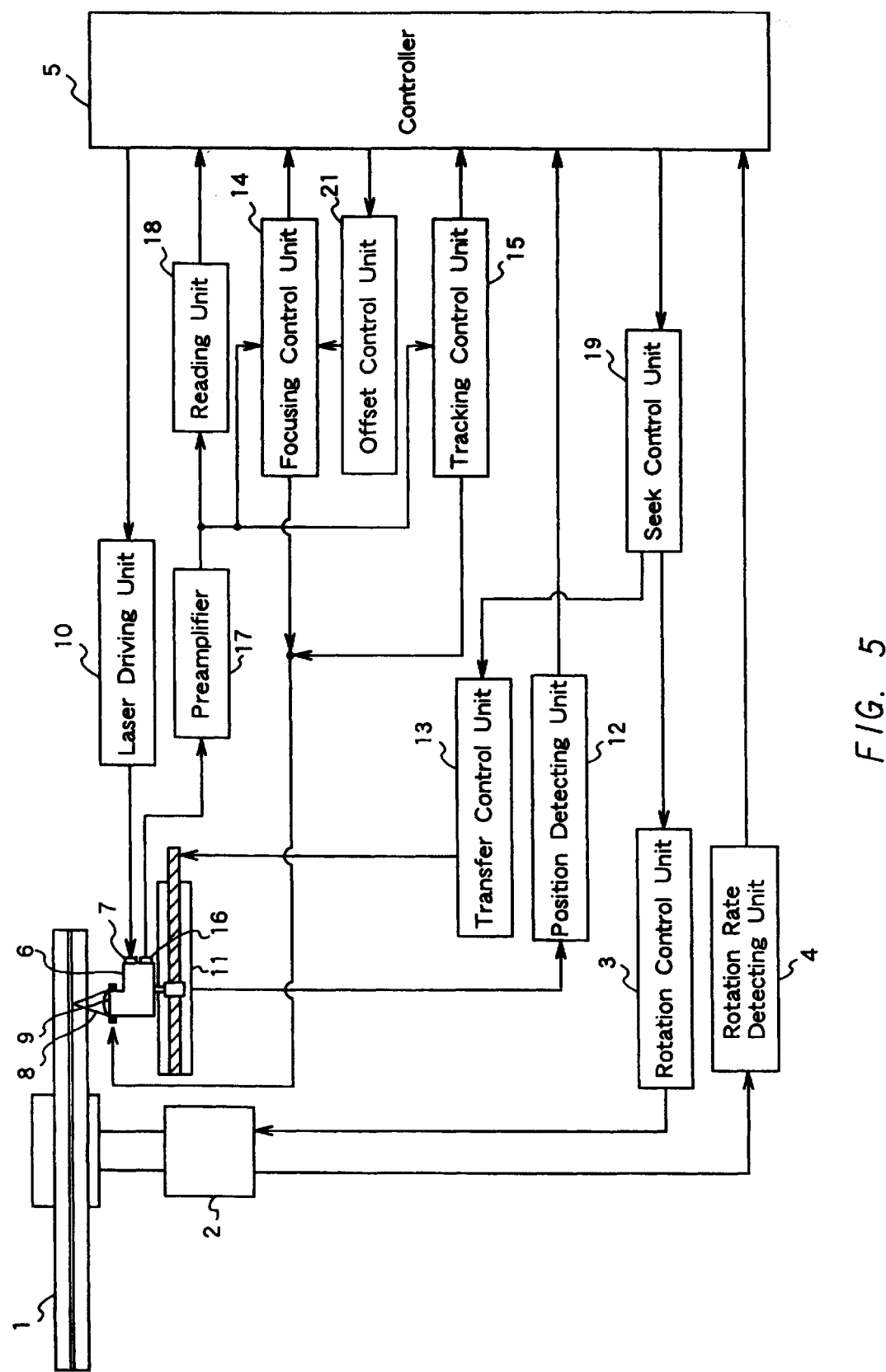
FIG. 5 is a schematic view showing the structure of an optical recording-reading device in a third embodiment of the present invention.

In FIG. 5, elements from the optical recording medium 1 to the detection control unit 19 can be the same as those of the first embodiment, except that an offset control unit 21 is provided thereto.

The operation of the optical recording-reading device in this embodiment is explained below.

Operations relating to those from the optical recording medium 1 to the seek control unit 19 correspond to those of the first embodiment. In this third embodiment, the focal position of the optical beam 8 is controlled by the offset control unit 21 to be set off from the position for the information reading, and also controlled by the focus control unit 14 in order to achieve focus only when it reaches the predetermined linear velocity.

The read light power of the optical beam 8 for reading the signals recorded in the optical recording medium 1 was decided in the same manner as the first embodiment. The focal offset amount of the optical beam 8 at seek was decided in the following manner. For instance, if the reading is conducted at the outermost periphery of the optical recording medium 1 and if the optical beam 8 moves to the innermost side with half the radius while keeping its rotation rate, the linear velocity is reduced by half. When the beam reads at the outer periphery at 6 m/s and moves to the innermost side, it scans the track at the linear velocity of 3 m/s. Therefore, the offset amount of the optical beam 8 for seek at the linear velocity of 3 m/s was decided from the relationship between the deterioration due to the read light and the offset amount of the optical beam 8.

In the experiments to decide the offset amount, a phase change recording medium was used for the optical recording medium 1 just as the read light was determined. The wavelength of the optical beam 8 was 680 nm, the aperture number (NA) of the object lens 9 was 0.6, and the Linear velocity was 6 m/s. In this condition, single signals having a wavelength of 5 MHz were recorded. The relationship between the degree of signal amplitude decrease and the focus offset amount was obtained when the record signals were continuously read 10 million times at 1.0 mW read light power and 3 m/s the linear velocity. The signal amplitude was not decreased when the focus offset amount was 1 μm or more. When the focus offset amount was 0.5 μm, the amplitude decrease was about 3 dB. In another experiment where the focus offset amount was 0.3 μm or less, the amplitude began to decrease soon after the tracking on the record signals, and the amplitude was remarkably decreased at the end. Considering the above result, the focus offset amount was set to be 1 μm when the optical beam 8 scans under the above condition. Here, "focus offset" means shifting the focal point of the optical beam 8 during a seek operation so that the intensity of the optical beam 8 irradiated on the portion of the optical recording medium 1 is decreased. The offset direction is not specifically limited: it can be above or below the portion where information is recorded.

In this manner, the focus offset is determined to be a certain value or more at seek. Therefore, increase of energy of the optical beam 8 irradiated on a certain area for a certain time can be prevented by setting off the focus of the optical beam 8 even if the optical beam 8 reads the inside of the optical recording medium 1 before the rotation rate of the motor 2 increases. As a result, deterioration due to the read light can be prevented even under low linear velocity where the optical beam 8 scans on the track before it reaches a predetermined linear velocity. And thus, the signals recorded on the optical recording medium 1 can be stored safely.

Although three embodiments are explained here, this invention is not limited to the case where each of these embodiment is used alone; these embodiment can be combined with each other, for instance, the second and third embodiments can be carried out with each other.

As mentioned above, the optical recording-reading device of this invention can prevent deterioration of the record signals on the optical recording medium due to the seeking optical beam, and thus, this invention can provide an optical recording-reading device which stores information safely.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. An optical recording-reading device comprising an optical head to produce an optical beam, a transfer system to move said optical beam, and a motor to rotate a disk optical recording medium having a recording thin film that changes its state due to the irradiation of said optical beam; said device conducting recording and reading at a relative velocity between said optical beam and said optical recording medium that is a substantially-constant linear velocity; the optical recording-reading device being provided with a transfer control unit to control the movement of said optical beam, and a rotation rate control unit to adjust the rotation rate of said optical recording medium, where the relative velocity between said optical beam and said optical recording medium is maintained at least at a predetermined linear velocity by using said transfer control unit and said rotation rate control unit when said optical beam moves to conduct a seek operation on said optical recording medium, wherein the rotation rate of said optical recording medium and the transfer of said optical beam are simultaneously controlled when the moving length of said optical beam is less than a predetermined value at seek; said transfer control unit begins to move said optical beam after said rotation rate control unit begins to control the rotation rate of said optical recording medium when the moving length of said optical beam is at least the predetermined value and the optical beam moves toward the inside of said optical recording medium; and said rotation rate control unit begins to control the rotation rate of said optical recording medium after said transfer control unit begins to move said optical beam when the moving length of said optical beam is at least the predetermined value and the optical beam moves toward the periphery of said optical recording medium.

* * * * *